United States Patent [19]

Lenhardt et al.

[11] Patent Number: 5,047,994

[45] Date of Patent: Sep. 10, 1991

[54] SUPERSONIC BONE CONDUCTION HEARING AID AND METHOD

[75] Inventors: Martin L. Lenhardt, Hayes; Alex M. Clarke; William Regelson, both of Richmond, all of Va.

[73] Assignee: Center for Innovative Technology, Herndon, Va.

[21] Appl. No.: 608,429

[22] Filed: Nov. 2, 1990

Related U.S. Application Data

[62] Division of Ser. No. 358,616, May 30, 1989, Pat. No. 4,982,434.

[51] Int. Cl.[5] .............................................. G01S 15/02

[52] U.S. Cl. .................................... 367/116; 381/68.3

[58] Field of Search ............... 367/116; 381/68.3, 68.1

[56] References Cited

U.S. PATENT DOCUMENTS

| | | | |
|---|---|---|---|
| 3,715,577 | 2/1973 | Bohman | 367/116 |
| 4,761,770 | 8/1988 | Kim et al. | 367/116 |

*Primary Examiner*—Daniel T. Pihulic

*Attorney, Agent, or Firm*—Rothwell, Figg, Ernst & Kurz

[57] ABSTRACT

A supersonic bone conduction hearing aid that receives conventional audiometric frequencies and converts them to supersonic frequencies for connection to the human sensory system by vibration bone conduction. The hearing is believed to use channels of communications to the brain that are not normally used for hearing. These alternative channels do not deteriorate significantly with age as does the normal hearing channels. The supersonic bone conduction frequencies are discerned as frequencies in the audiometric range of frequencies.

1 Claim, 2 Drawing Sheets

SUPERSONIC BONE CONDUCTION HEARING AID AND METHOD

This is a division of application Ser. No. 07/358,616, filed May 30, 1989 now U.S. Pat. No. 4,982,434.

This invention relates to hearing aids that shift the normal hearing frequencies to the supersonic range for transfer to the human sensory system by bone conduction and the like.

The traditional hearing aid is an air-conduction amplifying system such that a microphone picks up air conduction sounds, amplifies them and present them in the ear canals as an air conduction signal to the ear drum. These type of devices offer a small frequency range and also offer a small dynamic range of intensity.

Bone conduction hearing aids have also been developed for users where the conventional hearing aid is not satisfactory. A bone conduction device is attached to the head of the user and the output from a microphone pick-up is amplified and fed into this device which causes bone vibration. These devices operate over a small dynamic range and are designed principally for individuals whose middle ears could not be surgically repaired or for very young children who have abnormalities of the middle ear that cannot be surgically repaired until they are older. These bone conduction devices currently are rarely used.

Newer technology involves implanting rare earth magnets in the temporal bone and a microphone electronic coil system is used to cause the magnet to vibrate producing bone conduction hearing. These devices are also rarely used because of the surgery involved in drilling out the bone and putting the magnet in. However, their fidelity is reported to be very high.

There is no prior art showing the use of supersonic frequencies as a bone conducting hearing aid for normal hearing frequencies. There has been mention of supersonic frequency detection in the literature but not for hearing aids. All known textbooks suggests that hearing stops at 20,000 hertz.

The present invention involves transposing air conduction sounds in the conventional or audiometric range which is a frequency range of about 100 to about 10,000 hertz. These frequencies are shifted into the supersonic range which are frequencies above 20 kHz to about 108 kHz or higher and then transmit these supersonic frequencies by bone conduction or the like to the human sensory system. The hearing aid may transpose air conduction sound from the speech frequencies to the supersonic ranges in such a fashion that noise burst frequency modulated signals and quiet bursts that relate to speech frequencies will be shifted into the supersonic range. These signals are delivered by a bone conduction attachment such as a high fidelity electrical to vibrator transducer, preferably a piezoelectric type, functionally connected for bone conduction in the head.

While the inventors do not wish to be bound by any specific theory, it is hypothesized that the hearing aid and method of the present invention is based on a system of hearing quite distinct from normal hearing based on air conduction. It utilizes bone conduction and parallels the primary hearing response of reptiles. In reptiles, there is no air conduction hearing, but hearing is mediated via the saccule which, in man, has been considered an organ responsible for balance and determining acceleration and movement. In reptiles, this organ is a hearing instrument and it possesses hearing potential in amphibia and in fish as well.

Phylogenetically, in evolution, hearing in fish, amphibia and reptiles is mediated by vibratory frequencies that work through vestibular systems. In amphibia, both bone and air conducted frequencies impinge on vestibular receptors. In reptiles, air conduction hearing is nonexistent unless transduced via skin or bone to the vestibular saccule which is the primary hearing organ, as the cochlea does not exist. During evolution, as mammals evolved from reptiles, therapsids or amphibia, as gait, posture and skull evolved, so did the mammalian and avian cochlea which took over the role of the saccule as the primary hearing organ. The internal ear, or cochlea is now the primary mammalian acoustic contact with the external environment. The saccule, although equipped with the neuro-cortical functional capacity to ascertain sound became a back-up system of limited value, except for balance and motion detection. The awareness of the vestibular developmental role in evolutionary biology of hearing, was lost as physiologists expanded on our understanding of the role of air conduction with clinical emphasis on the physiology and pathology of the cochlea. Otolaryngologists, audiometrists, speech therapists, psychologists and physiologists look upon the saccule and utricular systems as accelerometers or motion detectors. The residual role of the saccule and vestibule in hearing perception is lost to current knowledge.

The hearing aid of the invention is believed to utilize direct bone transmission to the saccule and this enables hearing to be maintained via a system independent of air conduction and the inner ear although integrated with the air conduction system.

This provides a new device for allowing the nerve deaf to hear, but in addition, provides an alternative source of informational transfer independent of sounds moving through air. The sound is transmitted directly to the bones of the skull, and utilizes frequencies that are perceived by the saccule and not by the inner ear.

Apart from improving hearing in auditory nerve damaged users or hearing of those users suffering air conduction defects, this also permits the perfection of echo location devices for the blind that should perform better than those currently under development.

For echo location, dual electrical to vibration transducers are placed on separate designated locations on the cranium to provide stimulation to the saccules of each vestibule. This permits localized discernable signals returning from solid objects to enable the user to judge speed, distance and direction.

The echo location aspects of the invention are based on a determination that in the audiometric frequencies of 100 to 10,000 hertz the attenuation across the skull from one ear to the other is only in the range of zero to 20 decibels (dB) and even in the ultrasonic range of 10 to 20 kilohertz, there is only approximately 40 dB attenuation. However, in the supersonic range of over 20,000 hertz, the attenuation factor goes up and reaches 80 dB. Thus, when an audiometric tone is presented to one side of the skull, the propagation wave reaches the other side with little loss of energy, therefore, making echo location more difficult. However, in the supersonic range utilized by the present invention, there is a great loss of energy so that the hearing aid on one side can be distinguished from the hearing aid on the other side to give a far better capability at echo location both as to distance and direction. Bone conduction signals propagated above the 20 kilohertz frequency (supersonic) are along an osseous route, not an osteo tympanic route.

An advantage to utilization of the vestibule (saccule) as a hearing organ is that its response is transmitted via the vestibular nerve which can substitute for, or augment communication in a damaged acoustic nerve. The above is important in aging because of the relative longer functional life of the vestibular nerve in aging. The vestibular nerve also provides an alternative to acoustic nerve injury that is of value in the sensory/neural deaf.

If hearing is viewed from a physical perspective, the cochlea is a collection of receptors linked to a mechanical device that matches the impedance of sound in air with that of sound in the cochlear fluid. If this cochlear transformer or transducer was not present most of the sound energy would be reflected away from the head. In contrast to the air mediated response of the cochlea, the otolithic organs in the vestibule, the saccule and utricle, respond to acceleration or body movement and inertial forces. The cochlea responds to sound pressure in similar fashion to a microphone while the saccule acts as an accelerometer which measures sound (vibration) in a solid medium.

The features and advantages of the present invention will become more apparent from consideration of the following detailed description presented in connection with the accompanying drawings in which.

Figure 1:
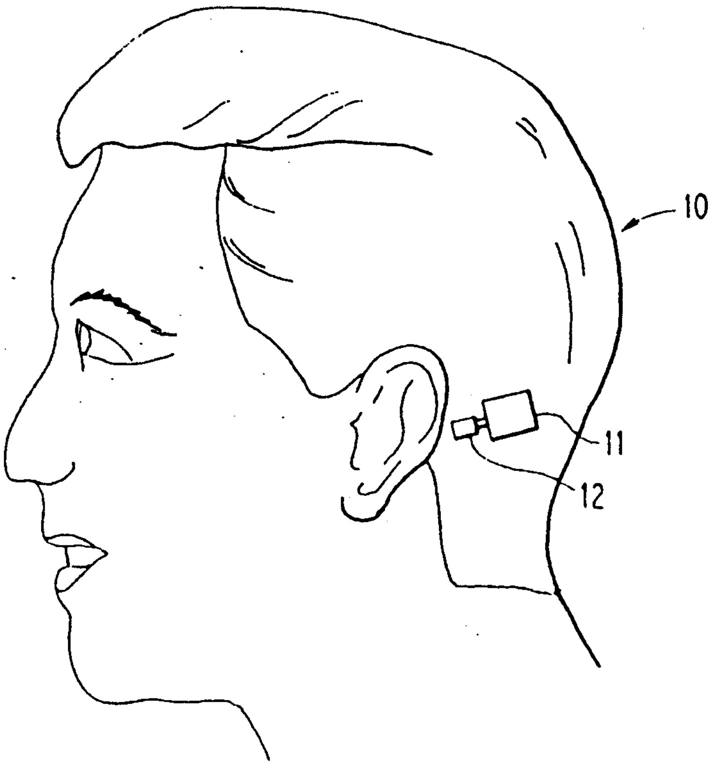
FIG. 1 shows a schematic of the hearing aid of the present invention located for bone conduction behind the left ear of the wearer.

With reference to FIG. 1, there is shown a typical user 10 with a hearing aid 11 having a bone conduction attachment 12. The hearing aid is preferably battery driven and its components will be described more fully below. The bone conduction attachment to the head can be done by either a clamping arrangement to clamp an electrical to vibration transducer to the head or attached to an embedded screw or any other manner developed for applying vibrations to the skull. Preferably, it is attached to the temporal bone. The vibrator or transducer which applies the vibrations to the skull for bone conduction must provide such vibrations at a frequency in the supersonic range and preferably from above 20,000 hertz to approximately 100,000 hertz.

Figure 2:
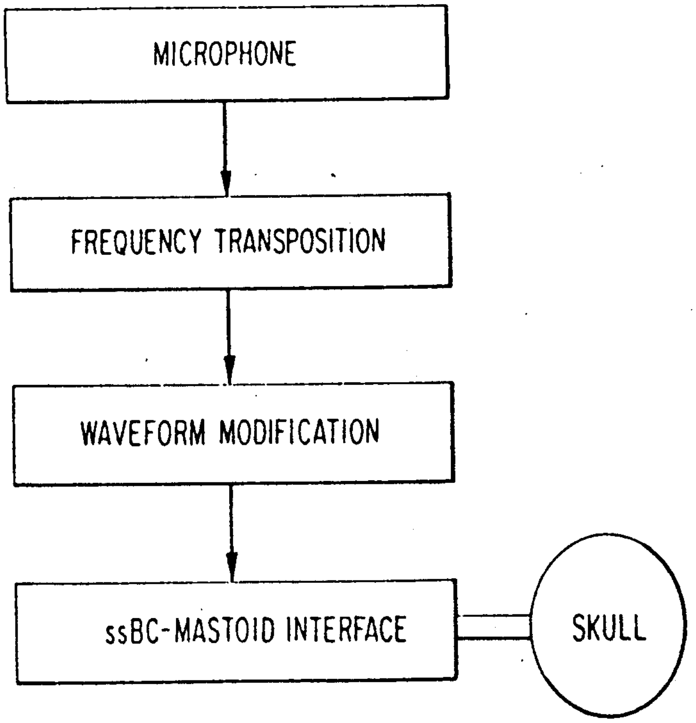
FIG. 2 shows a schematic of a form of hearing aid of the present invention.

With reference to FIG. 2, there is shown a block diagram of a form of a typical hearing aid utilizing this invention. First, there is a microphone or transducer for receiving sounds to pick up the normal air conducted audiometric frequencies especially of the spoken voice and convert them to an electrical signal. These frequencies are usually in the range of 100 to approximately 10,000 hertz. But the most important frequencies for a spoken voice are from 500 to 2500 hertz. These frequencies are amplified and converted to a higher frequency by the frequency transposition section of the hearing aid. The frequency conversion or transposition shifts the frequency up from a normal audiometric range to the supersonic range which is above 20,000 hertz and extends to approximately the 100,000 hertz range. This transformation function may be linear, logarithmic, a power function or a combination of these and may be customized for each individual. To improve the recognition of the sounds being heard, the waveform may be modified by the waveform modification or signal processor. For example, dichotic listening requires that the attack and decay times of several of the components of speech be of a specified size for maximum comprehension. The supersonic signal may be modified to optimize the intelligibility of the signal. However, even without the waveform modification, the signal has a substantial intelligibility as will be seen in one of the examples below.

The supersonic bone conduction (ssBC) transducer is an electric to vibration type to apply the supersonic signals as supersonic vibrations to the skull, preferably at the mastoid interface. These frequencies are perceived as frequencies within a normal audiometric range by the brain and permits an intelligible understanding of what is being heard in the audiometric range even though the brain receives the signals primarily at supersonic frequencies. This is a key element of the invention. Even though the frequencies are shifted to supersonic vibration frequencies they can still be interpreted by the brain as speech at audiometric frequencies.

The waveform modification may also include filters for certain bands which may have to be amplified further or some bands may have to be attenuated depending on how the signal is multiplied for customizing the hearing aid to the user. Customizing is not absolutely essential but can be used to improve the perceptual signal to the user so that it is a smooth speech perception that is balanced for the best perception.

Frequently, in voices, the low frequency will come in with the most intensity so low frequencies would in some cases be attenuated. Those frequencies that are critical for speech detection (500 to 2500 Hz) may be preferentially amplified.

While the signal can be handled by analog electronics, the improvements in digitizing have permitted the signal processing to be also done in digital form before being converted back to a form that can be utilized by the electrical to vibration transducer that applies supersonic bone conduction-like signals to the head.

The signals can be cleaned to improve the speech perception by lumping some frequencies such as frequencies below 500 hertz together and attenuating them. But the critical frequencies for voice communication between 500 hertz and 2500 hertz may be resolved so that small differences between the frequencies can be detected and discerned.

Also, the just noticeable differences (JND) of pitch varies at different frequencies generally in accordance with the 10% rule at supersonic frequencies. Pitch discrimination of young subjects show that at a tone of 2,000 hertz, the JND is approximately 2 hertz and at 15,000 hertz the JND is approximately 150 hertz. When the tone is 35,000 hertz the JND is approximately 4,000 hertz and at 40,000 hertz the JND is 4500 hertz. Thus, the 10% rule is that the JND is approximately 10% of the frequency of the tone and this extends into the supersonic region.

So in addition to bunching or lumping together the low frequencies below 500 hertz, the most important frequencies of 500 hertz to 2500 hertz and other frequencies can be expanded when converted to supersonic frequencies so that the small differences in the frequencies can still be discerned under the 10% rule.

This spreading of the frequencies should be done in such a way that the signals do not become smeared. If the differences are so great such a smearing can occur and will make the signal less clear.

There are a number of different modifications or processing of the signals that can be utilized giving a number of different options available for customizing a hearing aid to the individual. Also, filtering can be used to reduce noise especially in the case of the signal processing of digitized signals. Hearing impaired users normally have a great deal of difficulty in picking up speech embedded in background noise. Reduction in noise by signal processing including filtering can be very beneficial on improving the clarity of the signal.

The connector for connecting said supersonic vibration frequencies to a human sensory system preferably includes a transducer that vibrates the skull for bone conduction and this transducer is preferably a piezoelectric vibrator but most do not have a flat frequency response. One element of the customizing is the signal may need to be matched to the response to the output driver. The signal may be modified to adjust the frequencies so that the vibrator responds equally to the frequencies.

Hearing aids in the Scandinavian countries that are of the bone conduction type utilize a titanium screw in the bone of the head and the vibrator is attached to the screw. This requires a form of surgical implant. To avoid such surgery, preferably a head band is utilized to cause the hearing aid to be pressed against the temporal bone but normally the titanium screw arrangements provides a better conduction.

Figure 4:
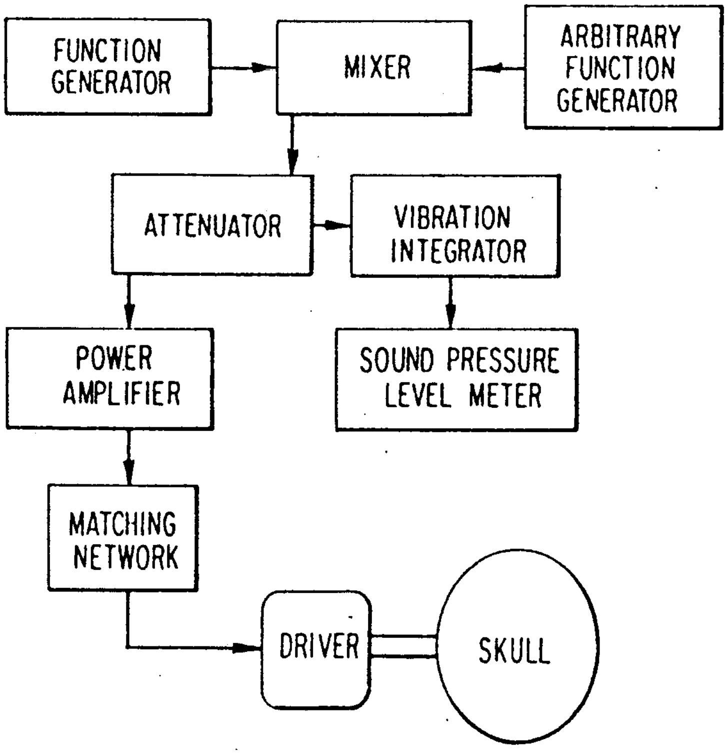
FIG. 4 shows a schematic of test apparatus used in performing some of the experiments of the present invention.

With reference to FIG. 4, there is shown a schematic of test apparatus in performing some of the experiments of the present invention. A Tektronix FG-504 Function Generator is used to present 2, 4, 8, 16, 32 and 40 kilohertz tones or such other tones as desired in performing the experiments. This form of generator is available from Tektronix, Inc., P.O. Box 500, Beaverton, Oreg. 97077. These tones are mixed by the mixer with a trapezoidal envelope from a Krohn-Hite Model 5910B Programmable Arbitrary Function Generator to provide a series of pulse tones. The Arbitrary Function Generator is available from Krohn-Hite Corporation, Avon Industrial Park, Bodwell Street, Avon, Mass. 02322. Mixing is performed by a circuit designed around an Analog Device AD533JD multiplier chip available from Analog Devices, 1 Technology Way, P.0. Box 280, Norwood, Mass. 02062. The signal level was controlled by Hewlett-Packard Model 350D Attenuator available from Hewlett-Packard Corporation, Palo Alto, Calif. Sound pressure thresholds are recorded in decibels as a measurement from the Quest Electronics Model 155 Sound Pressure Level Meter (available from Quest Electronics, 510 Worthington Street, Oconomowoc, Wis. 53066) which receives signals from the Attenuator through the Vibration Integrator. The signal from the Attenuator is also fed into a Wilcoxon Research Model PA7C Power Amplifier (available from Wilcoxon Research, 2096 Gaither Road, Rockville, Md. 20850) driving a F9/F3 shaker or Driver on a Model Z9 transducer base from the Model N9 Matching Network. The driving surface of the Driver shaker/transducer is placed on the post-auricle mastoid of the subject's best ear or left ear if both are equal. This arrangement can be used for both pitch matching and testing for just noticeable differences (JND).

Figure 3:
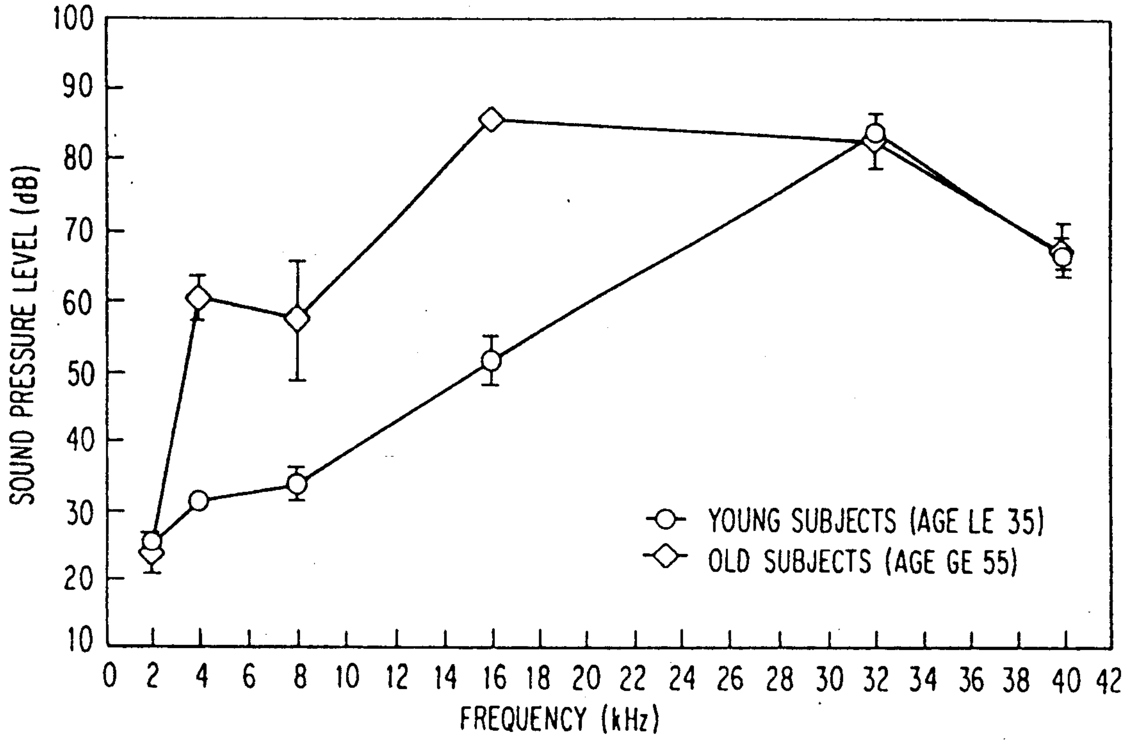
FIG. 3 shows a graph of sound pressure level related to frequency of both young and older subjects.

With reference to FIG. 3, there is shown a graph of sound pressure level (SPL) in decibels versus frequency in kilohertz for both young subjects of an age less than or equal to 35 years old and old subjects from an age greater than or equal to 55 years old. The data points are at 2, 4, 6 or 8, 16, 32 and 40 kilohertz. The lines between the data points do not reflect values but merely connect the data points. It is important to note that below 20 kilohertz in the audiometric and ultrasonic ranges there is significantly less hearing capability for the old subjects versus the young subjects but at 32 and 42 kilohertz old subjects have equal hearing capability. This is a surprising finding and is an important aspect to the invention as it indicates that the age related decline in hearing ability (presbycusis) while clearly present in the sonic and ultrasonic frequencies in elderly subjects has no substantial effect in the supersonic frequencies. In fact in some cases, elderly subjects have slightly lower thresholds than some of the young subjects. Thus, hearing loss as a result of the aging process is not present in the supersonic range as used by the present invention.

In one example of the present invention, a standard readily available microphone was used for picking up audiometric sounds and these were amplified using a standard type of readily available amplifier as would normally be the case. The signals were then fed into the Tektronix FG-504 Function Generator and by using a 30 kilohertz sine wave as a carrier was applied to a Driver of the piezoelectric type mentioned earlier which is clamped to the temporal bone of the subject. The amplitude modulated carrier signal, without further modification, gave better than 50% words and numbers recognition. It was found that frequency modulation did not work in the example utilized but only amplitude modulation. No training of the subject was involved and the brain was able to discern the supersonic signals as spoken words and numbers as though they had been heard in the audiometric range of frequencies.

Another example is to utilize a standard microphone pickup, amplify the signal and bunch the frequencies below 500 hertz and shift these frequencies and spread them out between 25,000 and 30,000 hertz in the supersonic range. The frequencies between 500 and 2500 which contain the very important frequencies for voice recognition are shifted to the 30,000 to 80,000 hertz range and are spread under the 10% rule so that the spacing of frequencies are greater for 80,000 hertz than they are at 30,000 hertz. The information above 25,000 Hz is also grouped and spread into the remainder of the supersonic range between 80,000 hertz and approximately 108,000 hertz. These frequencies are then applied as electrical signals to a piezoelectric driver clamped to the temporal bone of the user. Through bone conduction, the vibration frequencies in the supersonic range are perceived by the brain as the original audiometric frequencies. These signals can be modified to customize them to the individual subject and the piezoelectric driver being used. This may be done through a combination of attenuation of some of the frequencies, a great amplification of some of the other frequencies and by wave shaping of the signal.

Another example is to apply the supersonic bone conduction hearing aid to the temporal bone of both the left side and right side of the human body and use the signals received for echo location as to direction, distance and speed.

As another example, a source of supersonic sound (not shown) such as is readily available is radiated or beamed towards objects to be detected. Two spaced apart microphones one on each side of the head receives the radiated supersonic sound waves when they are reflected from the objects. The signal from the microphones convert the supersonic sound signals to electrical signals which are amplified by an amplifier and sent to the two bone conducting connectors which are supersonic electric to vibration transducers connected to each side of the head. The supersonic vibrations are transmitted to the human sensory system and assists in echo location of the detected objects.

The invention described is fundamental and is expected that numerous improvements will be made to the technology as it continues to evolve and it is to be understood that the above described arrangements are only illustrative of the application of the principles of the invention. Numerous modifications and alternative arrangements may be devised by those skilled in the art without departing from the spirit and scope of the invention and the appended claims are intended to cover such modifications and arrangements.

What is claimed is:

1. A supersonic hearing aid for echo location comprising:

a source of supersonic sound for radiating to objects to be detected;

two microphones adapted to be spaced apart for receiving said radiated supersonic sound waves when they are reflected from objects to be detected and converting said sounds to electrical signals;

an amplifier for said electrical signals; and two transducers for converting said amplified supersonic electrical signals to supersonic vibration signals for connecting said supersonic vibration signals to the human sensory system on both the left side and right side of the head to assist in echo location.

* * * * *